United States Patent
Daugherty

(10) Patent No.: US 7,484,160 B2
(45) Date of Patent: Jan. 27, 2009

(54) SYSTEMS AND METHODS FOR DELINEATING A CELL IN A COMMUNICATIONS NETWORK

(75) Inventor: Charles H. Daugherty, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 558 days.

(21) Appl. No.: 11/071,913

(22) Filed: Mar. 4, 2005

(65) Prior Publication Data

US 2006/0200730 A1    Sep. 7, 2006

(51) Int. Cl.
*H03M 13/00* (2006.01)
(52) U.S. Cl. .......... 714/758; 714/48; 714/703; 714/704; 714/776; 714/799
(58) Field of Classification Search ........ 714/776, 714/758, 775, 48, 703, 704, 799
See application file for complete search history.

(56) References Cited

U.S. PATENT DOCUMENTS

| | | | |
|---|---|---|---|
| 5,764,876 | A | 6/1998 | Yanagisawa et al. |
| 6,157,659 | A | 12/2000 | Bird |
| 6,188,692 | B1 * | 2/2001 | Huscroft et al. ........ 370/395.51 |
| 6,272,128 | B1 | 8/2001 | Pierson, Jr. |
| 6,411,629 | B1 * | 6/2002 | Bentall et al. ................ 370/458 |
| 6,449,254 | B1 | 9/2002 | Hadjiahmad |
| 6,633,566 | B1 | 10/2003 | Pierson, Jr. |
| 6,721,336 | B1 | 4/2004 | Witel et al. |
| 2002/0009089 | A1 | 1/2002 | McWIlliams |

FOREIGN PATENT DOCUMENTS

EP    0 397 384    11/1990

* cited by examiner

*Primary Examiner*—Esaw T Abraham
(74) *Attorney, Agent, or Firm*—Lawrence Cho; Dean D. Small; The Small Patent Law Group

(57) ABSTRACT

A method of performing cell delineation in a communications network is described. The method includes providing a data cell defined based on a communications protocol. The data cell forms at least a portion of a data stream. The method further includes mapping the data cell into frames defined based on a network protocol, where adjacent frames are separated by a frame boundary. The data cell and frames have a common fundamental base structure represented by a data unit The data cell includes a boundary data unit defining a cell boundary The boundary data unit includes validation information for an associated segment of data units in the data cell. The method also includes analyzing a set of the data units independent of the frame boundary to determine potential validation information. The method includes comparing the potential validation information with content of at least one of the data units to identify the boundary data unit and the frame boundary.

20 Claims, 4 Drawing Sheets

US 7,484,160 B2

SYSTEMS AND METHODS FOR DELINEATING A CELL IN A COMMUNICATIONS NETWORK

BACKGROUND OF THE INVENTION

The invention relates generally to communications over a communications network and more particularly to systems and methods for delineating a cell in the communications network.

The communications networks transport information among a number of locations. The information is usually presented to the communications network in the form of time domain multiplexed electrical signals, time domain multiplexed optical signals, or a combination of electrical and optical signals, and represents any combination of voice, video, and computer data. The communications networks include various physical sites interconnected by links.

DS1 is one type of electrical digital communications link. A DS1 link is capable of carrying 24 channels which are time domain multiplexed (TDM) and transmitted over a physical line. A DS1 link transmits one DS1 frame 8000 times per second or one frame every 125 microseconds. Each DS1 frame includes a DS1 payload with 24 timeslots, one for each channel with 8 bits in each timeslot. Each DS1 frame also has a DS1 overhead bit. One type of the overhead bit is a frame bit that identifies the start of the DS1 frame. An example of payloads mapped within the DS1 frames is asynchronous transfer mode (ATM) cells.

A DS1 extended superframe (ESF) is a group of 24 DS1 frames. Each ESF superframe includes an ESF overhead bit section that has 24 overhead bits, and an ESF payload section that has 24 samples of each of the 24 channels.

When the DS1 frames are in ESF format, layers of synchronization are used to find the DS1 frame #1 of the 24 DS1 frames in an ESF superframe. In other words, an ESF framer determines the location of the DS1 frame bits so that successive DS1 frames can be distinguished. The ESF framer also determines DS1 frame #1 in an ESF superframe so that successive ESF superframes can be distinguished. After the ESF framer locates the ESF superframes, cell delineation hardware locates the ATM cells in DS1 links that have an ATM payload to enable the monitoring or manipulation of the ATM cells.

DS1 framing is used whenever synchronization is lost. However, in conventional communications networks, complicated hardware is used to perform DS1 framing. Moreover, the hardware used to perform DS1 framing today is not scalable to an adequate extent. Additionally, it takes conventional framing and the cell delineation hardware a long time to distinguish one DS1 frame from another and find ATM cells within the DS1 frames.

BRIEF DESCRIPTION OF THE INVENTION

In one embodiment, a method of performing cell delineation in a communications network is described. The method includes providing a data cell defined based on a communications protocol. The data cell forms at least a portion of a data stream. The method further includes mapping the data cell into frames defined based on a network protocol, where adjacent frames are separated by a frame boundary, the data cell and frames have a common fundamental base structure represented by a data unit, the data cell includes a boundary data unit defining a cell boundary, and the boundary data unit includes validation information for an associated segment of data units in the data cell. The method also includes analyzing a set of the data units independent of the frame boundary to determine potential validation information. The method includes comparing the potential validation information with content of at least one of the data units to identify the boundary data unit and the frame boundary.

In an alternative embodiment, a system for delineating a cell is described. The system includes a network configured to convey a data cell defined based on a communications protocol. The data cell forms at least a portion of a data stream. The system also includes a cell mapper configured to map the data cell into frames defined based on a network protocol, where adjacent frames are separated by a frame boundary, the data cell and frames have a common fundamental base structure represented by a data unit, the data cell includes a boundary data unit defining a cell boundary, and the boundary data unit includes validation information for an associated segment of data units in the data cell. The system includes a cell delineator configured to analyze a set of the data units independent of the frame boundary to determine potential validation information. The cell delineator is further configured to compare the potential validation information with content of at least one of the data units to identify the boundary data unit and the frame boundary.

In another alternative embodiment, a cell delineator is described. The cell delineator includes an input configured to receive a data cell defined based on a communications protocol, where the data cell forms at least a portion of a data stream, the data cell is mapped into frames defined based on a network protocol, adjacent frames are separated by a frame boundary, the data cell and frames have a common fundamental base structure represented by a data unit, the data cell includes a boundary data unit defining a cell boundary, and the boundary data unit includes validation information for an associated segment of data units in the data cell. The cell delineator further includes a divider configured to analyze, independent of the frame boundary, a set of the data units to determine potential validation information. The cell delineator includes a comparator configured to compare the potential validation information with content of at least one of the data units to identify the boundary data unit and the frame boundary.

DETAILED DESCRIPTION OF THE INVENTION

Figure 1:
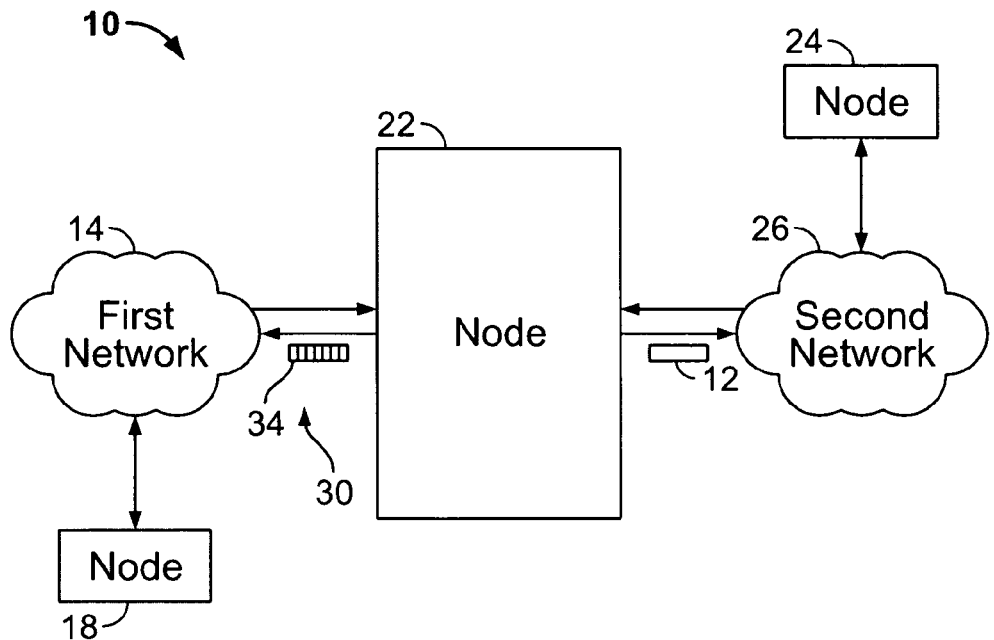
FIG. 1 is a block diagram of an exemplary embodiment of a communications system for delineating a data cell.

FIG. 1 is a block diagram of an exemplary embodiment of an environment 10 in which a system for delineating a data cell 12 is implemented. Environment 10 includes a first network 14, a node 18, a node 22, a node 24, and a second network 26. Examples of nodes 18, 22, and 24 include servers, computers, and other devices that are directly connected to one or both of first network 14 and second network 26.

Nodes 18, 22, and 24 recognize, process, or forward data transmissions received from first network 14 or alternatively received from second network 26. Examples of the first network 14 include a synchronous optical network (SONET) including synchronous transfer signal (STS-x) frames that accommodate DSx channels and Ex channels, where x is a non-negative integer. Examples of an STS-x frame include STS-1, STS-3, STS-9, STS-12, STS-18, STS-24, STS-36, and STS-48 frames. Examples of a DSx channel include a DS1 channel, a DS2 channel, a DS3 channel, a DS4 channel, and a combination of DS1, DS2, DS3, and DS4 channels. An example of the combination of DS1, DS2, DS3, and DS4 channels includes DS3 frames mapped with DS2 and DS1 frames within the payload of the DS3 frames. Examples of an Ex channel include an E1 channel, an E2 channel, an E3 channel, and a combination of E1, E2, and E3 channels. DSx or Ex is referred to as Mx. Examples of second network 26 include an asynchronous transfer mode (ATM) network. In one embodiment, node 22 is a part of first network 14. In an alternative embodiment, node 22 is a part of second network 26.

Node 22 receives a data stream 30 including a series of frames from first network 14, changes a format of the frames into a format compatible with second network 26 to generate data cell 12, and transmits data cell 12 to second network 26. For example, node 22 receives a series of Mx frames from first network 14, delineates an ATM cell from the Mx frames, and transmits the ATM cell to second network 26. The frames include multiple data units 34. Each data unit 34 may represent a byte, a bit, a word, or a group of bytes, bits, or words.

Node 22 receives data cell 12 via second network 26, converts a format of data cell 12 into a format compatible with the first network 14 to generate data stream 30, and transmits data stream 30 to the first network 14. For example, node 22 receives ATM cells from second network 26, maps the ATM cells into DS1 frames, and transmits the DS1 frames to first network 14.

Figure 2:
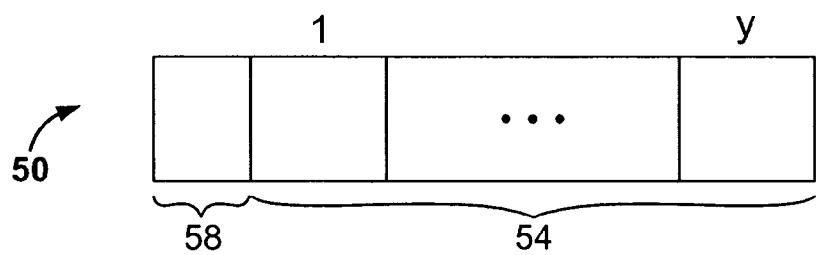
FIG. 2 shows an exemplary embodiment of a frame included within a data stream used within the environment of FIG. 1.

FIG. 2 shows an exemplary embodiment of a frame 50, included within data stream 30. Frame 50 may represent a DS1 frame that has a total length of 193 bits. Each frame 50 includes a payload segment 54 having y number of timeslots, one payload segment 54 for each frame 50 with z data units 34 in each timeslot. For example, y may be twenty-four and z data units 34 may be one byte. Each frame 50 also has a frame boundary 58 represented by a data unit, such as one frame bit, which identifies the start of frame 50. Frame boundary 58 distinguishes frame 50 from other frames.

Figure 3:
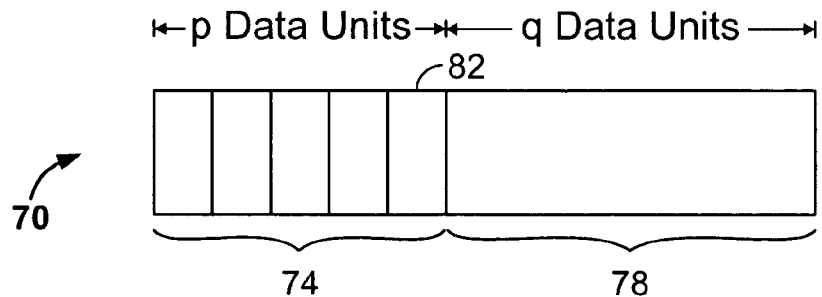
FIG. 3 shows an exemplary embodiment of a data cell communicated within the environment of FIG. 1.

FIG. 3 shows an exemplary embodiment of a data cell 70, which is an exemplary embodiment of data cell 12 shown in FIG. 1. An example of data cell 70 is an ATM cell. Data cell 70 has a standard format defined by international telecommunications union-telecommunications (ITU-T) standards. In an alternative embodiment, data cell 70 has a proprietary format defined by a company, industry, or a group. Data cell 70 includes a first set 74 of portions, such as a header, and includes a payload 78. First set 74 of portions is p number of data units 34 in length and payload 78 is q number of data units 34 in length. An example of p is five bytes and an example of q is forty-eight bytes. First set 74 of portions include a w number of portions. An example of w is five for an ATM cell, where each portion is one byte. First set 74 of portions includes a number of distinct header fields including a check field, which includes a cyclic redundancy code (CRC). For example, the header fields include a four bit generic flow control (GFC) field, a twelve bit virtual path indicator (VPI) field, a two byte virtual channel indicator (VCI) field, a three bit payload type (PT) field, a one bit cell loss priority (CLP) field, and a one byte header error check (HEC) field. The GFC field is reserved to carry an ATM cell flow rate as set by node 18 in FIG. 1. The VPI and VCI fields are used to identify a destination address, such as node 24, of an ATM cell. The PT field indicates whether an ATM cell contains user data, such as voice conversations, signaling data, or alternatively something else. The CLP field indicates a relative priority of an ATM cell. Lower priority ATM cells are discarded before higher priority ATM cells during intervals of congestion. The HEC field is an example of the check field. The check field is used to detect errors in first set 74 of portions caused by a physical line during transmission. The check field includes validation information and is an example of a cell boundary 82 that distinguishes data cell 70 from another data cell.

Figure 4:
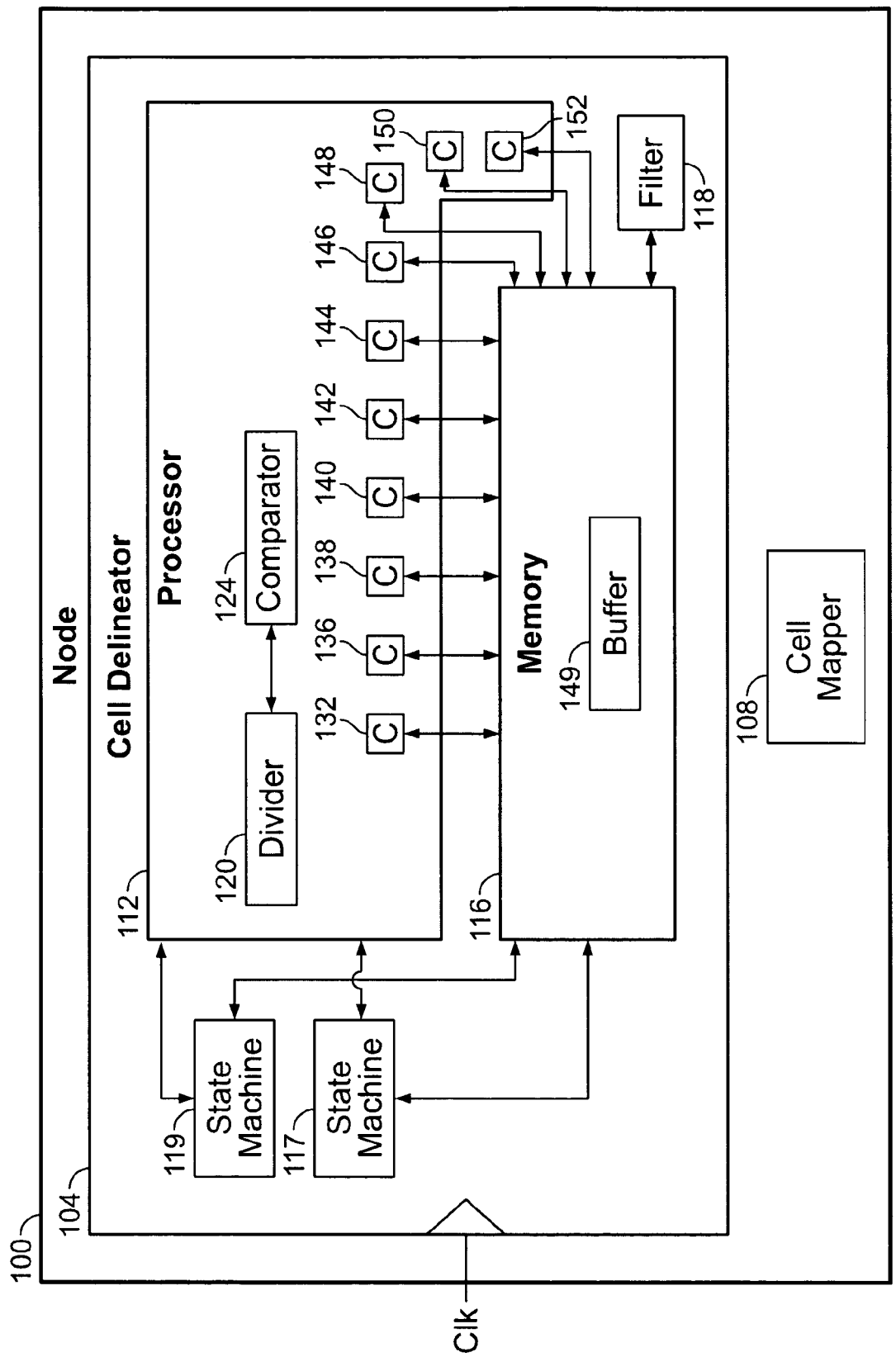
FIG. 4 shows a block diagram of an exemplary embodiment of a node that delineates a data cell.

FIG. 4 shows a block diagram of an exemplary embodiment of a node 100, which is an example of node 22 shown in FIG. 1. Node 100 is also an example of a system for delineating data cell 12. Node 100 includes a cell delineator 104 and a cell mapper 108. Cell delineator 104 includes a processor 112, a memory 116, a filter 118, a state machine 117, and a state machine 119. Processor 112 includes a divider 120, a comparator 124, a counter 132, a counter 136, a counter 138, a counter 140, a counter 142, a counter 144, a counter 146, a counter 148, a counter 150, and a counter 152. Processor 112 is coupled to state machine 117 and state machine 119. Examples of state machines include a computer, a processor, a computer program, and a synchronous digital logic design. The term processor, as used herein, refers to any one or alternatively a collection of microprocessors, controllers, microcomputers, programmable logic controllers, application specific integrated circuits, and other programmable circuits. Memory 116 includes a buffer 149. An example of memory 116 includes a field programmable gate array random access memory (FPGA RAM). Other examples of memory 116 include any one or alternatively a collection of storage devices, such as random access memory devices, read only memory (ROM) devices, and magnetic storage devices. An example of buffer 149 includes a first-in-first-out buffer. As an example, state machine 117 stores, in memory 116, nine bits of state information per bit position per DS1. As yet another example, state machine 117 stores states in a field programmable gate array random access memory having a width of 72 bits of state information per eight DS1 bit positions.

In an alternative embodiment, node 100 includes more than one cell delineator 104 and more than one cell mapper 108. Processor 112 receives data stream 30 and determines cell boundary 82 independent of frame boundary 58. For example, processor 112 receives data stream 30 and does not determine frame boundary 58 before determining cell boundary 82. As another example, processor 112 receives data stream 30 and simultaneously determines cell boundary 82 and frame boundary 58.

Cell delineator 104 delineates data cells based on a clock (CLK) signal. For example, when a frequency of the clock signal is 77.76 megahertz, the number of DS1 links from which cell delineator 104 delineates ATM cells is 336. In an alternative embodiment, the number of DS1 links from which cell delineator 104 delineates ATM cells is greater than 336 when processor 112 processes more than one byte of data at a time to delineate the ATM cells or the frequency of the clock signal is greater than 77.76 megahertz. In another alternative embodiment, the number of DS1 links from which cell delineator 104 delineates ATM cells is less than 336 when processor 112 processes less than one byte of data at a time to delineate the ATM cells, the frequency of the clock signal is less than 77.76 megahertz, or processor 112 does not process data on every clock cycle.

Processor 112 initiates the determination of cell boundary 82 independent of frame boundary 58 when processor 112 receives data stream 30 and analyzes whether frame boundary 58 is located between the first one of portions within first set 74 and a second one of portions within first set 74. As an example, processor 112 analyzes whether an overhead bit is located between the HEC field and the remaining fields of the header of an ATM cell.

Figure 5:
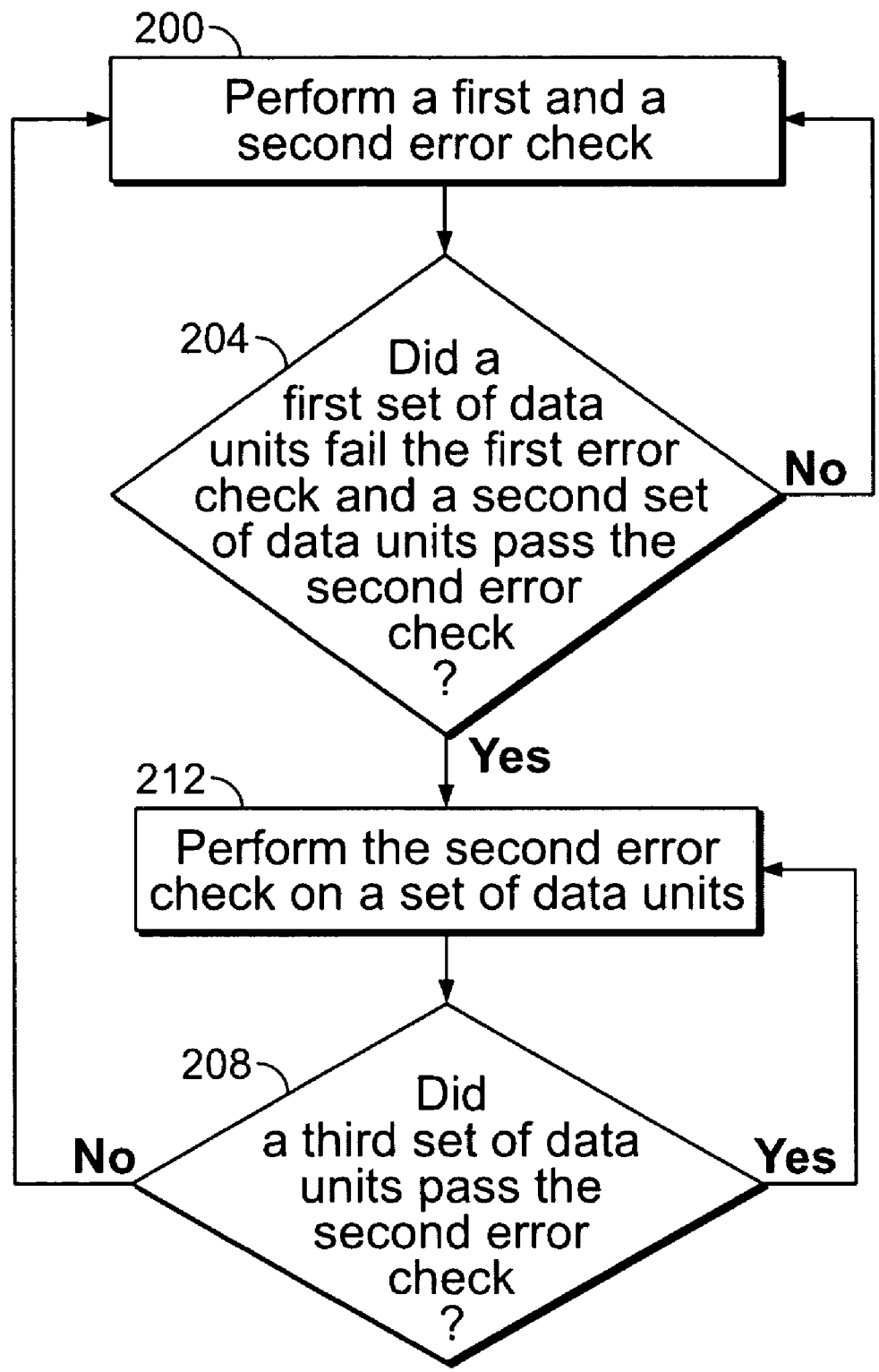
FIG. 5 is a flowchart of an exemplary embodiment of a method for delineating a data cell.

FIG. 5 is a flowchart of an exemplary embodiment of a method for delineating data cell 12 shown in FIG. 1. The method includes analyzing whether frame boundary 58 is located between the first and the second portions of first set 74 by performing, at 200, a first error check on a first set of data units 34, such as the header, and by also performing, at 200, a second error check on a second set of data units 34. The method also includes determining, at 204, whether the first set of data units 34 fail the first error check and the second set of data units 34 pass the second error check. On determining, at 204, that the first set of data units passes the first error check or the second set of data units fails the second error check, the method includes performing the first and the second error checks on a number of data units 34 until a set, such as the first set, of data units 34 that fails the first error check and a set, such as, the second set, of data units 34 that passes the second error check is found.

The method further includes performing, at 212, the second error check on a third set of data units 34 on determining, at 204, that the first set of data units 34 fail the first error check and the second set of data units 34 pass the second error check. The third set of data units 34 are located after a third number of data units 34 from the second set of data units 34. On determining, at 208, that the third set of data units 34, fail the second error check, method includes performing the first error check on a set, such as the first set, of data units 34, and performing the second error check on a set, such as the second set, of data units 34 until a set, such as the second set, of data units 34 that passes the second error check and a set, such as the first set, of data units 34 that fails the first error check is found. On determining, at 208, that the third set of data units 34 passes the second error check, the method includes continuing to perform, at 212, the second error check on a set, similar to the third set, of data units 34 located after a fourth number, similar to the third number, of data units 34 within data stream 30.

Next, the method illustrated in FIG. 5 is explained by utilizing environment 10 shown in FIG. 1. Processor 112 initiates to analyze whether frame boundary 58 is located between the first and the second portions of first set 74 by performing, at 200, the first error check on the first set of data units 34. As an example, a divider (not shown) of node 18, which sends data stream 30 to node 100, divides 32 bits of portions, other than the check field, within the header by a polynomial, such as $X^8+X^2+1$, to calculate a first remainder, which is an example of the validation information. After the first remainder is calculated, node 18 concatenates the first remainder to the 32 bits. Node 18 sends the header with the concatenated first remainder as part of data stream 30 to divider 120 of node 100. Divider 120 divides the header by the polynomial and generates a second remainder, which is transmitted to comparator 124 of node 100. The second remainder is an example of potential validation information.

Processor 112 performs, at 200, the first error check to evaluate whether the first set of the data units 34 pass the first error check. For example, when comparator 124 determines that the second remainder is equal to the first remainder, processor 112 determines that the first set of data units 34 pass the first error check. As another example, when comparator 124 determines that the second remainder is not equal to the first remainder, processor 112 determines that the first set of data units 34 fails the first error check. When the first set of data units 34 passes the first error check, processor 112 determines that the first set of data units 34 potentially includes first set 74 of portions. For example, when processor 112 determines that the first set of data units 34 pass the first error check, processor 112 determines that the first set of data units 34 potentially includes the header. When the first set of the data units 34 pass the first error check, processor 112 decides, at 204, that frame boundary 58 is not located between the first one of portions within the first set 74 and the second one of portions within the first set 74. For example, when comparator 124 determines that the second remainder is equal to the first remainder, processor 112 determines, at 204, that an overhead bit is not located between the HEC field and remaining fields within the header. When the first set of data units 34 fails the first error check, processor 112 determines that the first set of data units 34 does not include first set 74 of portions. For example, when processor 112 determines that the first set of data units 34 fails the first error check, processor 112 determines that the first set of data units 34 does not include the header.

Processor 112 initiates to analyze whether frame boundary 58 is located between the first and the second portions of first set 74 by also performing, at 200, the second error check on the second set of data units 34. For example, processor 112 assumes that one of data units 34 that divider 120 is currently evaluating is an overhead bit, such as a frame bit, ignores the overhead bit, and controls divider 120 to evaluate data units 34 within data stream 30 that are adjacent to the overhead bit. As another example, processor 112 assumes that one of data units 34 that divider 120 is currently evaluating is an overhead bit, ignores the overhead bit, controls divider 120 to evaluate b number of data units 34 within data stream 30 that are adjacent to and before the overhead bit, and controls divider 120 to evaluate m number of data units 34 within data stream 30 that are adjacent to and after the overhead bit. Examples of b include numbers between 4 and 1, and examples of m also include numbers between 1 and 4, where a sum of b and m is 5. As another example, processor 112 decides that one of data units 34 divider 120 is currently evaluating is an overhead bit, ignores the overhead bit, controls divider 120 to evaluate four data units 34 within data stream 30 that are adjacent to and before the overhead bit, and controls divider 120 to evaluate one data unit 34 within data stream 30 that is adjacent to and after the overhead bit.

Divider 120 evaluates data units 34 adjacent to an overhead bit in the same manner in which divider 120 performs the first error check on the first set of data units 34. For example, divider 120 divides, by the polynomial, data units 34 within data stream 30 that are adjacent to data unit 34 that is ignored and generates a third remainder, which is transmitted to comparator 124. The third remainder is an example of the potential validation information.

Processor 112 performs, at 200, the second error check to evaluate whether the second set of the data units 34 pass the second error check. For example, when comparator 124 determines that the third remainder is equal to the first remainder, processor 112 determines that the second set of data units 34 pass the second error check. As another example, when comparator 124 determines that the third remainder is not equal to the first remainder, processor 112 determines that the second set of data units 34 fail the second error check. When the second set of data units 34 passes the second error check, processor 112 determines that the second set of data units 34 potentially includes first set 74 of portions and frame boundary 58. For example, when the second set of data units 34 passes the second error check, processor 112 determines that second set of data units 34 potentially includes the header and an overhead bit. Processor 112 decides that frame boundary 58 is not located between the first one of portions within the first set 74 and the second one of portions within the first set 74 on evaluating that the second set of data units 34 fails the second error check. For example, when comparator 124 outputs that the third remainder is not equal to the first remainder, processor 112 decides that an overhead bit is not located between the HEC field and the remaining fields of the header of an ATM cell.

A first number of data units 34 in the first set of data units 34 is less than a second number of data units 34 in the second set of data units 34. As an example, the second set of data units 34 includes frame boundary 58 located between the first one of portions and the second one of portions within first set 74. As another example, the first set of data units 34 includes the header, and the second set of data units 34 includes an overhead bit and the header.

Processor 112 decides that the second set of data units 34 includes frame boundary 58 located between the first one of portions within first set 74 and the second one of portions within first set 74 on evaluating that the first set of the data units 34 fail the first error check and the second set of the data units 34 pass the second error check. For example, when the first remainder is not equal to the second remainder and equal to the third remainder, processor 112 decides that the second set of data units 34 includes an overhead bit located between the HEC field and the remaining fields of the header of an ATM cell.

When processor 112 decides that the first set of data units 34 fail the first error check and the second set of data units 34 fail the second error check, processor 112 decides that the second set of the data units 34 does not include frame boundary 58 and first set 74 of portions. For example, when comparator 124 determines that the first remainder is not equal to the second and third remainders, processor 112 decides that the second set of data units 34 does not include an overhead bit and the header.

Processor 112 identifies a location of frame boundary 58 within the first set of data units 34 when processor 112 determines that the second set of data units 34 pass the second error check and the first set of data units 34 fail the first error check. For example, processor 112 determines that an overhead bit is located between the HEC field and remaining fields of the header of an ATM cell when processor 112 determines the b and m numbers of data units 34. As another example, processor 112 determines that an overhead bit is located between the HEC field and remaining fields of the header of an ATM cell when processor 112 determines that b equals 4 and m equals 1. Processor 112 stores a location of frame boundary 58 in memory 116.

In one embodiment, when processor 112 determines, at 200, that the second set of data units 34 passes the second error check for different values of b, processor randomly determines one of the values of b. For example, when processor 112 determines that the second set of data units 34 passes the second error check for b=1 and b=2, processor 112 randomly ignores b=1 and determines that b=2. As another example, when processor 112 determines that the second set of data units 34 passes the second error check for b=1 and b=2, processor 112 randomly ignores b=2 and determines that b=1. Processor 112 also stores values of b and m in memory 116. In an alternative embodiment, processor 112 stores the value of b in memory 116 and does not store the value of m. The value of m can be calculated from the value of b. In another alternative embodiment, processor 112 stores the value of m in memory 116 and does not store the value of b. The value of b can be calculated from the value of m.

Before processor 112 performs, at 200, a first and a second error check, the state of state machine 117 is initialized to an initialization state. When processor 112 determines, at 204, that the second set of data units 34 passes the second error check and fails the first error check and before processor 112 performs, at 212, the second error check on the third set of data units 34, processor 112 changes a state of state machine 117 from the initialization state to an active state. Processor 112 stores a state, such as the initialization and active states, of state machine 117 in memory 116. When processor 112 determines, at 208, that the third set of data units 34 fails the second error check, processor 112 changes the state of state machine 117 from the active state to the initialization state.

When processor 112 determines, at 204, that the first set of data units passes the first error check or the second set of data units fails the second error check, processor 112 performs the first and the second error checks on a number of data units 34 until processor 112 finds a set, such as the first set, of data units 34 that fails the first error check and a set, such as, the second set, of data units 34 that passes the second error check.

When processor determines, at 204, that the first set of data units fails the first error check and the second set of data units passes the second error check, processor 112 determines the third number of data units 34 within data stream 30 between the second set of data units 34 and the third set of data units 34 expected by processor 112. The third set of data units 34 is the same as the second set of data units 34 except frame boundary 58 within the third set of data units 34 is shifted by one of portions within first set 74 compared to frame boundary 58 within the second set of data units 34. For example, when an overhead bit is located between b and m number of data units 34 within the second set of data units 34, where b equals three and m equals two, an overhead bit is located between b and m number of data units 34 within the third set, where b equals two and m equals three. An example of the third number of data units 34 is a number of data units 34 mapped into an N number of DS1 frames between the second and third sets of data units 34. Counter 132 counts the N number of DS1 frames between a set, such as the second set, and another set, such as the third set, of data units 34.

The third set of data units 34 include frame boundary 58 within first set 74 of portions and the third number of data units 34 do not include frame boundary 58 within first set of portions 74. For example, no header of an ATM cell located between an ATM cell that includes the second set of data units 34 and an ATM cell that includes the third set of data units 34 includes an overhead bit. As another example, data stream 30 includes ATM cells and the header of a first of the ATM cells includes an overhead bit. Headers of four ATM cells sequential to the first ATM cell do not include an overhead bit and the header of a sixth ATM cell sequential to the four ATM cells includes an overhead bit. As yet another example, data stream 30 includes ATM cells and the header of the first of the ATM cells includes an overhead bit. Headers of eight ATM cells sequential to the first ATM cell do not include an overhead bit and the header of a tenth ATM cell sequential to the eight ATM cells includes an overhead bit. In the third set of data units 34, frame boundary 58 is located between the first one of portions and the second one of portions within first set 74.

When processor 112 determines, at 204, that the first set of data units fails the first error check and the second set of data units passes the second error check, processor 112 does not perform the first and the second error checks on the third number of data units 34 between the second set and the third set of data units 34. For example, in data stream 30 that includes ATM cells, after processor 112 finds the header located within the first of the ATM cells and including an overhead bit, processor does not perform the first and second error checks on the four ATM cells that sequentially follow the first ATM cell. When processor 112 determines, at 204, that the first set of data units 34 fails the first error check and the second set of data units 34 passes the second error check, processor 112 performs, at 212, the second error check on the third set of data units 34. As an example, in data stream 30 that includes ATM cells, after processor 112 finds the header of the first of the ATM cells that includes an overhead bit, processor does not perform the first and second error checks on the four ATM cells that sequentially follow the first ATM cell and performs the second error check on the sixth ATM cell that sequentially follows the four ATM cells. As another example, in data stream 30 that includes ATM cells, after processor 112 finds the header of the first of the ATM cells that includes an overhead bit, processor does not perform the first and second error checks on the eight ATM cells that sequentially follow the first ATM cell and performs the second error check on the tenth ATM cell that sequentially follows the eight ATM cells.

Counter 136 is reset when the current state of state machine 117 is the initialization state. When the current state of state machine 117 is the active state and when processor 112 determines, at 208, that the third set of data units 34 passes the second error check, counter 136 increments or alternatively decrements a count by one. For example, when the current value of counter 136 is one, the current state of state machine 117 is the active state, and processor 112 determines, at 208, that the third set of data units 34 passes the second error check, counter 136 is incremented to two and stored in memory 116.

When processor 112 determines, at 208, that the third set of data units 34 passes the second error check, processor 112 decrements b and increments m. As an example, when the third set of data units 34 includes two data units 34 before and adjacent to an overhead bit and three data units adjacent to and after the overhead bit, and processor 112 determines, at 208, that the third set of data units 34 passes the second error check, processor 112 decrements b from 2 to 1 and increments m from 3 to 4. In one embodiment, values of b decrement from 4 to 1 and change back directly to 4 from 1. Values of m increment from 1 to 4 and change back directly to 1 from 4.

When processor 112 determines, at 208, that the third set of data units 34 fails the second error check, processor 112 performs the first error check on a set, such as the first set, of data units 34, and performs the second error check on a set, such as the second set, of data units 34 until a set, such as the second set, of data units 34 that passes the second error check and a set, such as the first set, of data units 34 that fails the first error check is found. When processor 112 determines, at 208, that the third set of data units 34 passes the second error check, processor 112 continues to perform, at 212, the second error check on a set, similar to the third set, of data units 34 located after the fourth number of data units 34 within data stream 30. When the third set of data units 34 passes the second error check, as explained below, state machine 119 transitions from a hunt mode to a pre-sync mode. The transition of state machine 119 from the hunt mode to the pre-sync mode occurs once counter 136 counts a programmable number of sequential sets of data units 34 that pass the second error check.

In an alternative embodiment, current values of the state of state machine 117, b, m, counter 132, and counter 136 are stored in memory 116 for each and every bit within frame 50 for each link. For example, 193 sets of current values of the state of state machine 117, b, m, counter 132, and counter 136 are stored in memory 116 for each DS1 link. Each set of current values of the state of state machine 117 is associated with one of 193 bits within a DS1 frame for one DS1 link.

Figure 6:
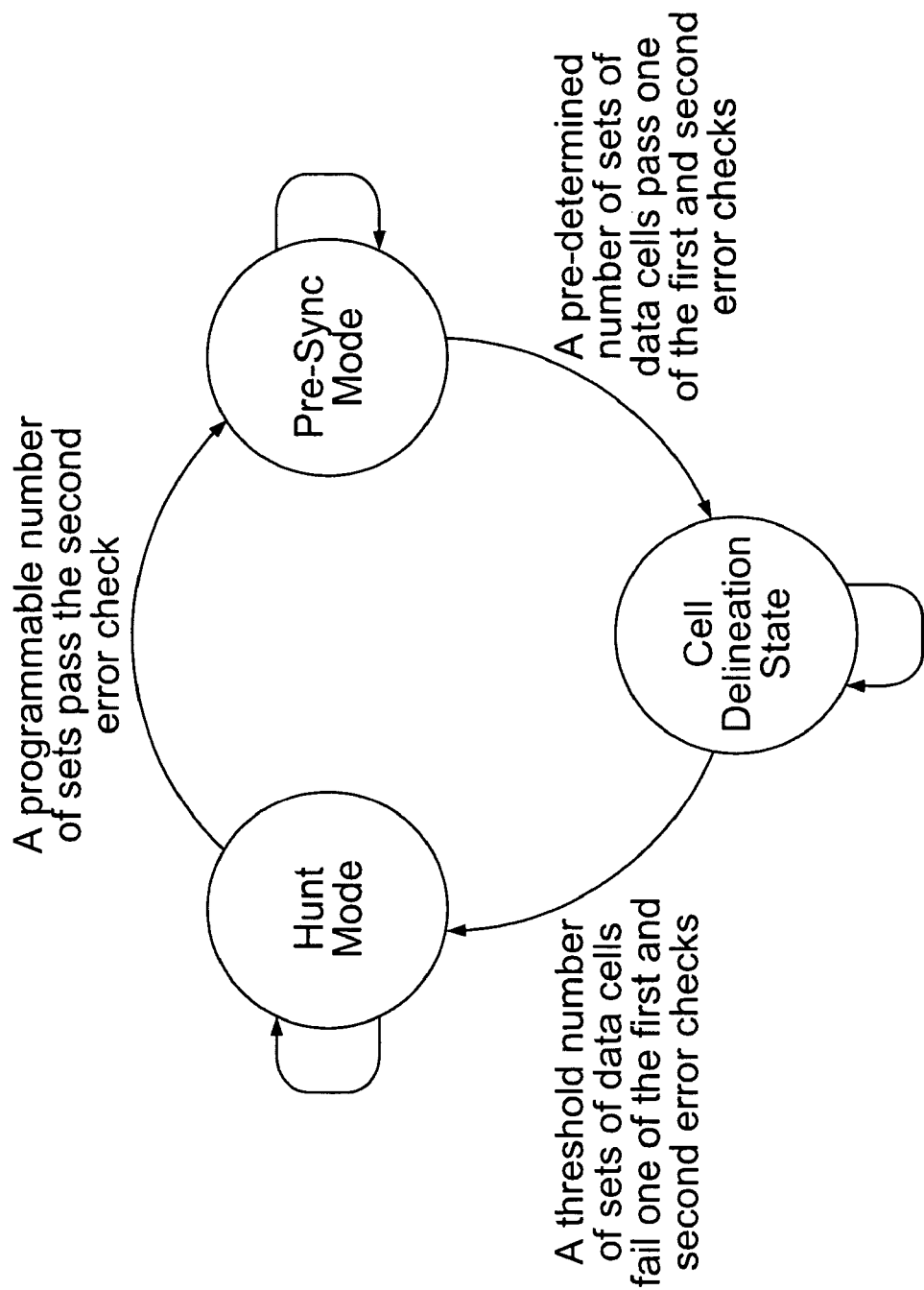
FIG. 6 is a state diagram of an exemplary embodiment of a method for delineating a data cell.

FIG. 6 is a state diagram of an exemplary embodiment of a method for delineating data cell 12. Processor 112 initializes a state of state machine 119 to the hunt mode when processor 112 receives data stream 30 and before performing the first and second error checks on data stream 30. The state of state machine 119 is stored in memory 116. Once counter 136 counts the programmable number of sequential sets of data units 34 that pass the second error check, processor 112 changes a state of state machine 119 from the hunt mode to the pre-sync mode. For example, when the second and third sets of data units 34 pass the second error check, a count of counter 136 is equal to two, and the programmable number is equal to two, processor 112 changes a state of state machine 119 from the hunt mode to the pre-sync mode. The programmable number is stored in memory 116 by a user. An example of the programmable number includes an integer, such as one, two, or three, greater than zero.

During the pre-sync mode, processor 112 finds cell boundary 82 based on a count of counter 138 that counts a number of data units 34 of data cell 12. For example, when count of counter 138 is 423 bit positions, processor 112 determines that a least significant bit of the HEC field within an ATM cell has been located. Counter 138 is reset by processor 112 when processor 112 determines cell boundary 82 is located. Counter 138 does not count frame boundary 58 located between data units 34 of data cell 12 when counting a number of the data units of the data cell. Once processor 112 finds data cell 12 during the pre-sync mode, for each data cell 12 found, processor 112 determines, based on a count of counter 140, whether to perform the first error check or alternatively the second error check. Memory 116 stores a position of frame boundary 58 within frame 50 that is currently being processed by processor 112 and counter 140 counts a number of positions adjacent to and after frame boundary 58 and adjacent to and before data unit 34 currently being evaluated by processor 112.

Based on a count of counter 140 and a position of frame boundary 58 within frame 50, processor 112 determines whether to perform the first error check or alternatively the second error check on a set of data units 34 within data cell 12. For example, when a current bit position within a DS1 frame is a least significant bit of the HEC field and when the number of bits adjacent to and after the overhead bit position and adjacent to and before the current bit position is equal to or greater than 39, processor 112 determines not to perform the second error check on data units 34 of the header and performs the first error check on the data units. As another example, when a current bit position within a DS1 frame is a least significant bit of the HEC field and when the number of bits adjacent to and after the overhead bit position and adjacent to and before the current bit position is less than 39, processor 112 determines to perform the second error check on data units 34 of the header and an overhead bit located between the data units.

During the pre-sync mode, when processor 112 determines to perform the second error check, based on a count of counter 140 and a position of frame boundary 58 within frame 50, processor 112 determines the b and m numbers of data units 34 to perform the second error check on the b and m numbers of data units 34 and frame boundary 58 located between first set 74 of portions having the b and m numbers. During the pre-sync mode, when processor 112 determines to perform the second error check, processor 112 determines to perform the second error check for a single value of b and a single value of m. For example, when a current bit position is a least significant bit within the HEC field and when the number of bits adjacent to and after the overhead bit position and adjacent to and before the current bit position is 31, processor 112 determines that b equals one and m equals four, and performs the second error check on the b=1 and m=4 number of data units 34 and on an overhead bit located between first set 74 of portions having the b and m numbers. Processor 112 does not perform the second error check on b=4 and m=1, on b=3 and m=2, and on b=2 and m=3 number of data units 34 located adjacent to an overhead bit when processor 112 determines that b=1 and m=4 during the pre-sync mode.

Counter 142 counts a number of sets of data units 34 that do not include frame boundary 58 located between two sets of data units 34 that include frame boundary 58. For example, counter 142 counts four ATM cells having headers that do not include an overhead bit and located between a first header that includes an overhead bit and a second header that includes an overhead bit. The first header is located within an ATM cell and the second header is located within another ATM cell that follows the four ATM cells. As another example, counter 142 counts eight ATM cells having headers that do not include an overhead bit and located between a third header that includes an overhead bit and a fourth header that includes an overhead bit. The third header is located within an ATM cell and the fourth header is located within another ATM cell that follows the eight ATM cells. During the pre-sync mode, processor 112 resets counter 142 each time processor 112 determines that frame boundary 58 is located within first set 74 of portions.

In an alternative embodiment, during the pre-sync mode, processor 112 determines whether to perform the first or alternatively the second error check on a set of data units 34 based on a count of counter 142. For example, when processor 112 evaluates a set of data units 34 and when a count of counter 142 is any number from one to eight, processor 112 determines to perform the first error check on the set of data units 34 and does not perform the second error check on the set of data units 34. As another example, when a count of counter 142 is zero when processor 112 evaluates a set of data units 34, processor 112 determines to perform the second error check on the set of data units 34 and does not perform the first error check on the set of data units 34. When processor 112 determines to perform the second error check, processor 112 determines to perform the second error check based on values of b and m. Processor 112 performs the second error check on the b and m number of data units 34 for a single value of b and a single value of m and on frame boundary 58 located between the b and m number of data units 34. For example, when b=3 and m=2, processor 112 determines to perform the second error check on b=3 and m=2 data units 34 and an overhead bit between first set 74 of portions having the b and m numbers. Processor 112 does not perform the second error check on b=4 and m=1, on b=2 and m=3, and on b=1 and m=4 data units 34 located adjacent to an overhead bit when processor 112 determines that b=3 and m=2 during the pre-sync mode.

During the pre-sync mode, processor 112 determines, based on a count of counter 144, whether a pre-determined number of sequential sets of data cells within data stream 30 pass one of first and second error checks. An example of the pre-determined number includes an integer, such as one, two, or three, greater than zero. Counter 144 counts the pre-determined number of sequential sets of data cells that pass one of the first and second error checks. When processor 112 determines that the pre-determined number of sequential sets of data cells pass one of first and second error checks, processor 112 controls state machine 119 to transition from the pre-sync mode into a cell delineation state. As an example, when the pre-determined number is two and processor 112 determines that a fourth set of data units 34 pass one of the first and second error checks and that a fifth set of data units 34 pass one of the first and second error checks, processor 112 changes state of state machine 119 from the pre-sync mode into the cell delineation state. The fourth set of data units 34 is sequential to the third set of data units 34. For example, the third set of data units 34 is within an ATM cell that precedes an ATM cell that includes the fourth set of data units 34. The fifth set of data units 34 is sequential to the fourth set of data units 34. For example, the fourth set of data units 34 is within an ATM cell that precedes an ATM cell that includes the fifth set of data units 34. In an alternative embodiment, node 100 does not include counter 142.

During the cell delineation state, processor 112 finds cell boundary 82 based on a count of counter 146 that counts a number of data units 34 of data cell 12. For example, when count of counter 146 is 423 bit positions, processor 112 determines that a least significant bit of the HEC field within an ATM cell has been located. Counter 146 is reset by processor 112 when processor 112 determines cell boundary 82 is located. Counter 146 does not count frame boundary 58 located between data units 34 of data cell 12 when counting a number of the data units of the data cell. Once processor 112 finds data cell 12 during the cell delineation state, for each data cell 12 found, processor 112 determines, based on a count of counter 148, whether to perform the first error check or alternatively the second error check. Memory 116 stores a position of frame boundary 58 within frame 50 that is currently being processed by processor 112 and counter 148 counts a number of positions adjacent to and after frame boundary 58 and adjacent to and before data unit 34 currently being evaluated by processor 112.

Based on a count of counter 148 and a position of frame boundary 58 within frame 50, processor 112 determines whether to perform the first error check or alternatively the second error check on a set of data units 34 within data cell 12. For example, when a current bit position within a DS1 frame is a least significant bit of the HEC field and when the number of bits adjacent to and after the overhead bit position and adjacent to and before the current bit position is equal to or greater than 39, processor 112 determines not to perform the second error check on data units 34 of the header and performs the first error check on the data units. As another example, when a current bit position within a DS1 frame is a least significant bit of the HEC field and when the number of bits adjacent to and after the overhead bit position and adjacent to and before the current bit position is less than 39, processor 112 determines to perform the second error check on data units 34 of the header and an overhead bit located between the data units.

During the cell delineation state, when processor 112 determines to perform the second error check, based on a count of counter 148 and a position of frame boundary 58 within frame 50, processor 112 determines the b and m numbers of data units 34 to perform the second error check on the b and m numbers of data units 34 and frame boundary 58 located between first set 74 of portions having the b and m numbers. During the cell delineation state, when processor 112 determines to perform the second error check, processor 112 determines to perform the second error check for a single value of b and a single value of m. For example, when a current bit position is a least significant bit within the HEC field and when the number of bits adjacent to and after the overhead bit position and adjacent to and before the current bit position is 31, processor 112 determines that b equals one and m equals four, and performs the second error check on the b=1 and m=4 number of data units 34 and on an overhead bit located between first set 74 of portions having the b and m numbers. Processor 112 does not perform the second error check on b=4 and m=1, on b=3 and m=2, and on b=2 and m=3 number of data units 34 located adjacent to an overhead bit when processor 112 determines that b=1 and m=4 during the cell delineation state.

Counter 150 counts a number of sets of data units 34 that do not include frame boundary 58 located between two sets of data units 34 that include frame boundary 58. For example, counter 150 counts four ATM cells having headers that do not include an overhead bit and located between a first header that includes an overhead bit and a second header that includes an overhead bit. The first header is located within an ATM cell and the second header is located within another ATM cell that follows the four ATM cells. As another example, counter 150 counts eight ATM cells having headers that do not include an overhead bit and located between a third header that includes an overhead bit and a fourth header that includes an overhead bit. The third header is located within an ATM cell and the fourth header is located within another ATM cell that follows the eight ATM cells. During the cell delineation state, processor 112 resets counter 150 each time processor 112 determines that frame boundary 58 is located within first set 74 of portions.

In an alternative embodiment, during the cell delineation state, processor 112 determines whether to perform the first or alternatively the second error check on a set of data units 34 based on a count of counter 150. For example, when processor 112 evaluates a set of data units 34 and when a count of counter 150 is any number from one to four, processor 112 determines to perform the first error check on the set of data units 34 and does not perform the second error check on the set of data units 34. As another example, when a count of counter 150 is zero when processor 112 evaluates a set of data units 34, processor 112 determines to perform the second error check on the set of data units 34 and does not perform the first error check on the set of data units 34. When processor 112 determines to perform the second error check, processor 112 determines to perform the second error check based on values of b and m. Processor 112 performs the second error check on the b and m number of data units 34 for a single value of b and a single value of m and on frame boundary 58 located between the b and m number of data units 34. For example, when b=3 and m=2, processor 112 determines to perform the second error check on b=3 and m=2 data units 34 and an overhead bit between first set 74 of portions having the b and m numbers. Processor 112 does not perform the second error check on b=4 and m=1, on b=2 and m=3, and on b=1 and m=4 data units 34 located adjacent to an overhead bit when processor 112 determines that b=3 and m=2 during the cell delineation state.

When, during the cell delineation state, processor 112 determines, based on a count of counter 152, that a threshold number of sequential sets of data cells within data stream 30 fails one of the first and second checks, processor 112 changes a state of state machine 119 from the cell delineation state to the hunt mode. An example of the threshold number includes an integer, such as one, two, or three, greater than zero. Counter 152 counts the threshold number of sequential sets of data cells that fail one of the first and the second error checks. For example, processor 112 performs one of the first and second error checks on the sixth set of data units 34 and one of the first and second error checks on a seventh set of data units 34. The sixth set of data units 34 is sequential to the fifth set of data units 34. For example, the fifth set of data units 34 is within an ATM cell that precedes an ATM cell that includes the sixth set of data units 34. The seventh set of data units 34 is sequential to the sixth set of data units 34. For example, the sixth set of data units 34 is within an ATM cell that precedes an ATM cell that includes the seventh set of data units 34. When the threshold number is two and processor 112 determines that the sixth set of data units 34 fails one of the first and second error checks and that the seventh set of data units 34 fails one of the first and second error checks, state machine 119 transitions from the cell delineation state to the hunt mode. In an alternative embodiment, node 100 does not include counter 150. In another alternative embodiment, node 100 does not include counter 146, counter 148 and counter 152. For example, counter 138 provides the same function as counter 146, counter 140 provides the same function as counter 148, and counter 144 provides the same function as counter 152.

In an alternative embodiment, current values of the state of state machine 119, counter 138, counter 140, counter 142, counter 144, counter 146, counter 148, counter 150, and counter 152 are stored in memory 116 for each DS1 link. Each set of current values is associated with one DS1 link.

During the cell delineation state, processor 112 detects any idle or unassigned data cells from data stream 30 and filter 118 drops the data cells. For example, ATM cells with zeroes in the VCI and VPI fields are detected by processor 112 and filter 118 drops the ATM cells. In an alternative embodiment, during the cell delineation state, processor 112 does not detect any idle or unassigned data cells from data stream 30.

Moreover, during the cell delineation state, processor 112 determines whether errors in any data cells that fail one of the first and second error checks can be corrected. An example of the errors includes single-bit errors. In an alternative embodiment, during the cell delineation state, processor 112 does not determine whether errors in any data cells that fail one of the first and second error checks can be corrected.

When processor 112 determines that the errors can be corrected, processor 112 corrects the errors in data cells and sends the data cells to buffer 149. When processor 112 determines that the errors in data cells cannot be corrected, filter 118 drops the data cells. Data cells stored in buffer 149 are transmitted to second network 26. Cell mapper 108 receives data cells from second network 26 or alternatively from cell delineator 104, maps the data cells into frames, and transmits the frames to first network 14.

It is noted that in one embodiment, a set of data units 34 includes one data unit. For example, the first set of data units 34 includes a bit. It is also noted that in an alternative embodiment, functions executed by processor 112 are embodied into a computer program that is stored in memory 116. For example, the method, illustrated in FIG. 5, for delineating data cell 12 is embodied in a computer program that is executed by processor 112.

Technical effects of the system and method for delineating data cell include delineating data cell 12 independent of frame boundary 58. There is no need to delineate frame boundary 58 before delineating cell boundary 82. The system and method for delineating data cell 12 takes less time to delineate data cell 12 independent of frame boundary 58 than time taken to delineate the data cell from an ESF frame by an ESF framer and an ATM cell delineator. Moreover, an embodiment of the system for delineating data cell 12 is low cost in design because a limited amount of memory 116, such as a random access memory with a width of 72 bits, which is readily available, is used to store state information when processor 112 processes data stream 30 a byte at a time. Moreover, the system for delineating data cell 12 is scalable because a width of memory 116 can be increased or decreased to accommodate the multiple number of Mx channels required per the application. Furthermore, the system for delineating data cell 12 uses less time to delineate data cells from frames than time taken by the ESF framer and the ATM delineator.

While the invention has been described in terms of various specific embodiments, those skilled in the art will recognize that the invention can be practiced with modification within the spirit and scope of the claims.

What is claimed is:

1. A method of performing cell delineation in a communications network, the method comprising:
   providing a data cell defined based on a communications protocol, the data cell forming at least a portion of a data stream;
   mapping the data cell into frames defined based on a network protocol, wherein adjacent frames are separated by a frame boundary, the data cell and frames having a common fundamental base structure represented by a data unit, the data cell including a boundary data unit defining a cell boundary, the boundary data unit including validation information for an associated segment of data units in the data cell;
   independent of the frame boundary, analyzing a set of the data units to determine potential validation information; and
   comparing the potential validation information with content of at least one of the data units to identify the boundary data unit and the frame boundary.

2. A method in accordance with claim 1 wherein at least one of the data units is adjacent to the set of the data units.

3. A method in accordance with claim 1 wherein the potential validation information represents a cyclic redundancy code for the set of data units.

4. A method in accordance with claim 1 wherein the boundary data unit represents a header error control check point having a length of one of a bit, a byte and a word.

5. A method in accordance with claim 1 wherein the frame boundary is not identified before the analyzing.

6. A method in accordance with claim 1 wherein the identifying simultaneously determines the frame boundary and the cell boundary.

7. A method in accordance with claim 1 wherein the frame boundary represents a bit gap.

8. A method in accordance with claim 1 wherein a length of the data cell is not an integer multiple of a length of one of the frames.

9. A method in accordance with claim 1 wherein the data cells differs in length from the frames.

10. A method in accordance with claim 1 wherein the cell delineation is performed in an asynchronous transfer mode (ATM) network.

11. A method in accordance with claim 1 wherein the identifying analyzes whether the frame boundary is located between a first one of the data units in the set and a second one of the data units in the set.

12. A system for delineating a cell, the system comprising:
   an input configured to receive a data cell defined based on a communications protocol, the data cell forming at least a portion of a data stream;
   a cell mapper configured to map the data cell into frames defined based on a network protocol, wherein adjacent frames are separated by a frame boundary, the data cell and frames having a common fundamental base structure represented by a data unit, the data cell including a boundary data unit defining a cell boundary, the boundary data unit including validation information for an associated segment of data units in the data cell; and
   a cell delineator configured to analyze, independent of the frame boundary, a set of the data units to determine potential validation information, the cell delineator further configured to compare the potential validation information with content of at least one of the data units to identify the boundary data unit and the frame boundary.

13. A system in accordance with claim 12 wherein at least one of the data units is adjacent to the set of the data units.

14. A system in accordance with claim 12 wherein the potential validation information represents a cyclic redundancy code for the set of data units.

15. A system in accordance with claim 12 wherein the boundary data unit represents a header error control check point having a length of one of a bit, a byte and a word.

16. A system in accordance with claim 12 wherein the boundary data unit is not identified before the cell delineator analyzes the set of data units.

17. A system in accordance with claim 12 wherein the cell delineator identifies the boundary data unit by simultaneously determines the frame boundary and the cell boundary.

18. A cell delineator comprising:
   an input configured to receive a data cell defined based on a communications protocol, the data cell forming at least a portion of a data stream, the data cell mapped into frames defined based on a network protocol, wherein adjacent frames are separated by a frame boundary, the data cell and frames having a common fundamental base structure represented by a data unit, the data cell including a boundary data unit defining a cell boundary, the boundary data unit including validation information for an associated segment of data units in the data cell;
   a divider configured to analyze, independent of the frame boundary, a set of the data units to determine potential validation information; and
   a comparator configured to compare the potential validation information with content of at least one of the data units to identify the boundary data unit and the frame boundary.

19. A cell delineator in accordance with claim 18 wherein at least one of the data units is adjacent to the set of data units.

20. A cell delineator in accordance with claim 18 wherein the potential validation information represents a cyclic redundancy code for the set of data units.

* * * * *